United States Patent [19]
Schulz-Hennig

[11] Patent Number: 4,542,392
[45] Date of Patent: Sep. 17, 1985

[54] METHOD AND APPARATUS FOR SETTING AND MONITORING AN EXPOSURE SPOT FOR PRINTING

[75] Inventor: Jörg Schulz-Hennig, Heikendorf, Fed. Rep. of Germany

[73] Assignee: Dr. Ing. Rudolf Hell GmbH, Fed. Rep. of Germany

[21] Appl. No.: 543,519

[22] Filed: Oct. 19, 1983

[30] Foreign Application Priority Data

Nov. 6, 1982 [EP] European Pat. Off. ........ 82110242.3

[51] Int. Cl.⁴ ............................................. G01D 15/14
[52] U.S. Cl. ..................................... 346/160; 346/108; 250/201; 250/204
[58] Field of Search ................ 346/108, 160; 250/201, 250/201 AF, 201 DF, 204, 205; 358/300, 302

[56] References Cited

U.S. PATENT DOCUMENTS

| | | | |
|---|---|---|---|
| 3,725,574 | 4/1973 | Gast | 346/108 X |
| 3,893,129 | 7/1975 | Endo et al. | 250/201 AF X |
| 4,386,272 | 5/1983 | Check, Jr. et al. | 346/108 X |
| 4,404,571 | 9/1983 | Kitamura | 346/108 |

*Primary Examiner*—Thomas H. Tarcza
*Attorney, Agent, or Firm*—Hill, Van Santen, Steadman & Simpson

[57] ABSTRACT

Point-to-point film exposure for recording rasters continuous tone images and linework characters in scanner technology wherein the exposure spot is defined by the light intensity, the size, the focus and intensity distribution which are controlled to achieve a uniform and high contrast exposure.

13 Claims, 12 Drawing Figures

METHOD AND APPARATUS FOR SETTING AND MONITORING AN EXPOSURE SPOT FOR PRINTING

BACKGROUND OF THE INVENTION

1. Field of the Invention

The invention relates in general to reproduction technology and particularly point-by-point film exposure for recording rasters, continuous tone images and linework characters in scanner technology wherein the exposure spot is defined by the intensity of the light, the size of the spot, the edge steepness or focus and the intensity distribution which are controlled so as to achieve uniform and high contrast exposures.

2. Description of the Prior Art

Scanners wherein raster points are exposed onto photographic material using multitrack recording elements are employed at the present time in printing technology when producing raster color separations on photographic materials. This type of recording with a plurality of light beams mounted next to each other is disclosed, for example, in U.S. Pat. No. 3,725,574 which system requires a precise adjustment of the sub-beams so that the line contact prevails between the individual sub-beams and so that unexposed strips do not result on the film.

Using present state of the art scanner technology the adjustment and observation of the point properties is indirectly monitored by using test exposures and the focus or sharpness of the beam is also measured or respectively is set by using a distance template whereby constant monitoring on the part of the user is required. Particularly when evaluating a false or undesired intensity distribution on the basis of the exposure result is only approximately possible because of the convolution of the gradation curve of the film and such evaluations result in a considerable loss of material and loss of time.

SUMMARY OF THE INVENTION

It is an object of the present invention to provide a method and apparatus with which the light power distribution, focus, and intensity distribution of the exposure spot is controlled and monitored automatically. The invention achieves this by utilizing an exposure spot composed of a plurality of controllable single beams mounted next to each other and the exposure spot is scanned using a gap of known width behind which a photo transducer is mounted and which is mounted in the exposure plane and is aligned at right angles relative to the direction of the sub-beams. The scanning occurs by relative motion between the gap and the exposure spot and the light power passing through the gap is measured. The light power is also detected by a second detector and the electrical signals from the two photo transducers are utilized after digitally processing them to control the intensity of the light. Another embodiment of the invention controls the magnification element and yet other embodiments control the focus.

The spot can be formed by means of an overlap of a plurality of sub-beams as, for example, twelve sub-beams with gaussian beam profile and the size of the spot can be determined by means of the imaging scale of a zoom lens and the intensity distribution can be determined by the individual amplitudes controlled by a light modulator. If, for example, an outage of a channel occurs, maladjustment or the like this can be detected with the method and apparatus of the present invention and its cause can be easily determined. With the present invention, it is possible to determine the characteristic quantities for the electro-mechanical or optical final control elements.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

The invention will be described showing its various functions but it is to be realized that these functions can be simultaneously performed. For example, the various functions accomplished with the invention of measurement and correction of the intensity distribution, the correction of andadjustment of the dimensions so as to obtain line contact control and adjustment of the focus and detecting errors in the system. Basically, the exposure spot is controlled in all of its functions by advancing the write unit over a narrow gap which is situated in the plane of the film in front of a light detector which might be, for example, a silicon photo diode wherein integration can be accomplished in the recording direction and integral measurement occurs with a second detector.

Alternatively, the light detector together with the gap can be moved passed the stationary exposure spot using a displacement unit. Also, the light point or spot can be passed over detectors using an optical deflection device for example by means of a galvanometer or a polygonal mirror. Instead of the use of a mechanical or optical motion, the point or spot can also be imaged onto a CCD device which has sufficient resolution and is electronically interrogated.

Figure 1:
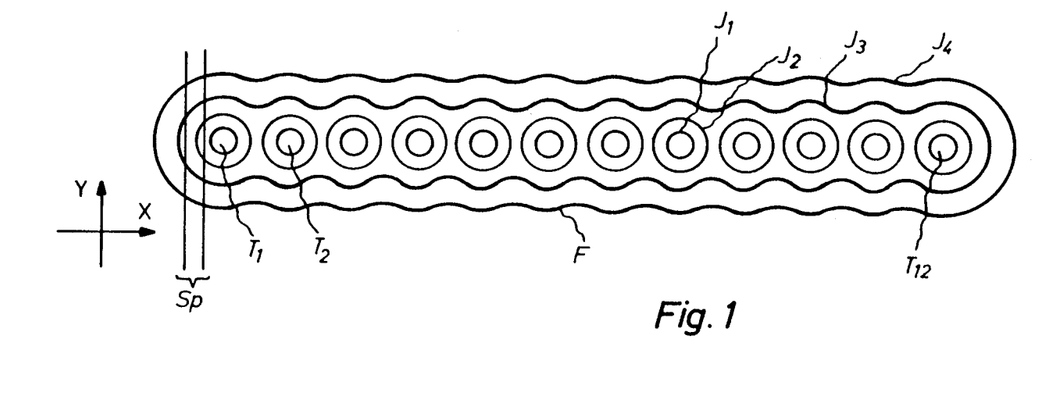
FIG. 1 comprises a schematic illustration of the formation of an exposure spot consisting of twelve sub-beams.

FIG. 1 illustrates an exposure spot F which is formed, for example, by twelve sub-beams ($T_1 \ldots T_{12}$) wherein the individual sub-beams illustrate a gaussian intensity distribution and the solid lines represent lines of identical power densities ($J_1, J_2 \ldots J_4$). The two parallel lines illustrate the measuring gap Sp which is traversed by the exposure spot.

Figure 2:
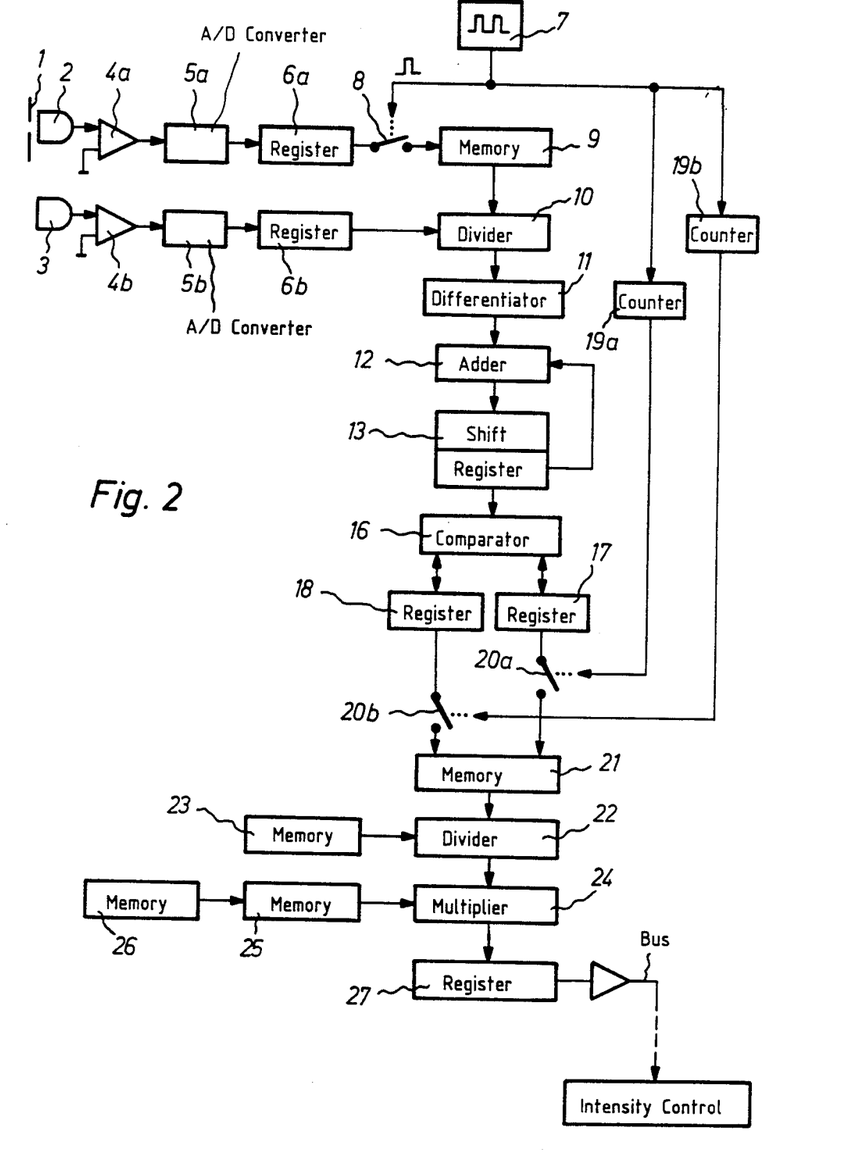
FIG. 2 illustrates a means for measuring the intensity distribution of the exposure spot.
Figure 3:
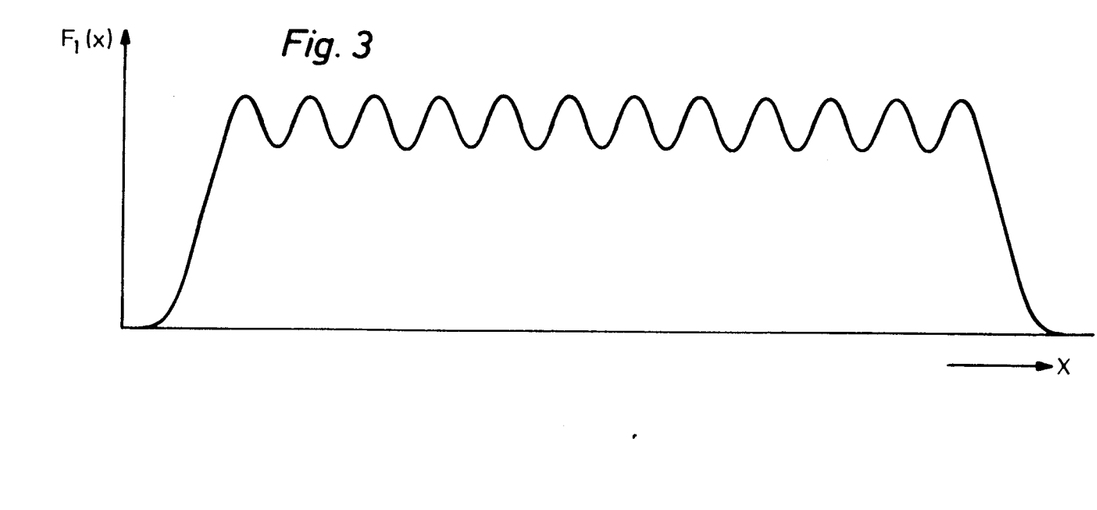
FIG. 3 illustrates a representation of the intensity distribution within the exposure spot.

FIG. 2 illustrates in block form the invention for measuring and correcting its intensity distribution wherein the curve of the intensity distribution illustrated in FIG. 3 serves as an example of the rated curve of the intensity distribution that corresponds to the shape of the exposure spot illustrated in FIG. 1. An individual beam has a half width of 40 μm and the gap width is 10 μm in a particular example according to the invention. The light incident upon the detector 2 through the schematically illustrated gap 1 is amplified in amplifier 4a and is converted to digital information in the analog to digital converter 5a and is supplied and loaded into a register 6a. A second light detector 3 receives light energy which is not passed through the gap 1 and supplies its output to an amplifier 4b which supplies an output to the analog-to-digital converter 5b which feeds into a register 6b to store the integral signal output of the second detector 3. The clock generator 7 which is controlled by a suitable clock actuates a switch 8 connected at the output of register 6a and periodically loads the measured amplitude values into a memory 9. A divider 10 receives the output of the memory 9 and an input from the register 6b and the amplitude values in memory 9 are divided by the integral values from the register 6b. The output of the divider 10 is operated on in a manner which will be described later by supplying the output of the divider to a differentiator 11 which supplies an output to an adder 12 which supplies its output to a shift register 13. The shift register 13 supplies a feedback signal to the adder 12 as shown. The differential quotient is thus added to a previously determined value from the shift register 13 and is subsequently reloaded into the register 13. The actual amplitude values determined are supplied to a comparator 16 that compares these values with the previous maximum and minimum amplitude values which have been stored in registers 17 and 18 and reloads these given downward or upward transgressions. Two counters 19a and 19b are connected to the clock generator 7 and are alternately energized and alternately load the maximum and minimum values in the registers 17 and 18 into a memory 21 through switches 20a and 20b. These values characteristic of the amplitude adjustment are supplied to a divider 22 where they are divided by the rated distribution values stored in a memory 23. The resultant quotients from the output of divider 22 are multiplied in a multiplier 24 by certain coefficients so as to control the characteristic. These coefficients are loaded from a memory 25 and these values are selected by the current amplitude control value in a memory 26. The output of the multiplier 24 which comprises the corrected amplitude control values are loaded into a register 27 and are sent over a data bus through an amplifier to an intensity control which might, for example be a multi-frequency acousto-optical modulator.

Figure 4:
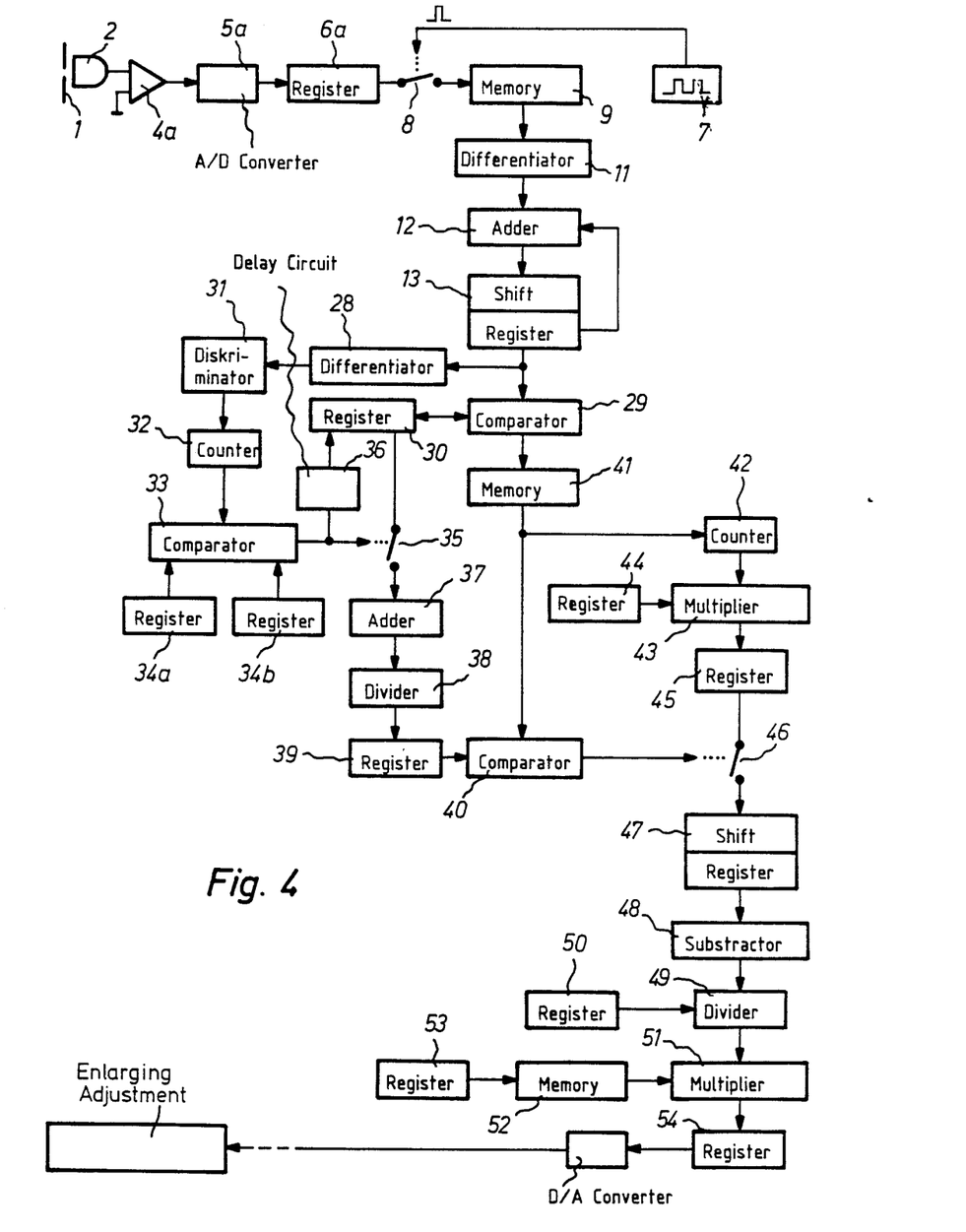
FIG. 4 illustrates apparatus for measuring and correcting the size of the exposure spot.

The measurement and correction of the size of the exposure spot must be very precisely observed when using line by line exposure so as to assure a line contact occurs. FIG. 4 illustrates a control of the magnification element so as to control the size of the exposure spot. Light which passes through the gap 1 is measured with the detector 2 and amplified in a amplifier 4a and converted to digital information in the analog to digital converter 5a. It is then loaded into a register 6a and supplied to a memory 9 through a switch 8 which is controlled by the clock generator 7. The measured amplitude values are differentiated in a differentiator 11 and supplied to an adder 12 where they are added to a previously determined value stored in shift register 13 and the output of the adder is also supplied to the shift register 13. The output of the shift register 13 is supplied to a differentiator 28 and to a comparator 29. The comparator 29 interrogates the maximum value stored in a register 30 and reloads it. The amplitude values proceed unaltered also into a memory 41. The slope value of the amplitude curve identified in the differentiator 28 is interrogated so as to determine changes of operational sign in discriminator 31 which has an output supplied to the counter 32. The counter 32 output is compared in a comparator 33 to the first and last maximums stored in two registers 34a and 34b and the output of the comparator is supplied to a switch 35 to actuate it. A delay element 36 receives the output of the comparator 33 and supplies an output to the register 30 to set it to zero. A delimiter value which corresponds to the point of overlap of two sub-beams in the exposure spot is identified from the resulting maximum amplitude values of the first and last sub-beams which are identified by an adder 37 which receives the output of the register 30 and the adder 37 supplies an output to a divider 38 which supplies an output to a register 39. The output of the register 39 is compared in the comparator 40 with the output of the memory 41. A counter 42 receives the output of the memory 41 and supplies an input to a multiplier 43 which also receives an input from a register 44 and the counter reading is multiplied by the value of the advance rate path per clock that is stored in the register 44 and the output of the multiplier 43 is supplied to a register 45. Switch 46 receives the output of the register 45 and supplies an input to a shift register 47 and this input is equal to the delimited value. A substractor 48 receives the output of the shift register 47 and forms the differential value of the first and last path values which is supplied to a divider 49 where it is divided by the rated path value stored in a register 50. The resultant quotient are supplied from the divider 49 to a multiplier 51 where they are multiplied by the coefficients for the control characteristic supplied from a memory 52 which are selected from the characteristic values that determine the current location of the elements such as the zoom lens for controlling the size of the spot and which have been previously loaded into a register 53 which supplies an input to the memory 52. The output of the multiplier 51 comprises the corrected magnification value and it is supplied into a register 54 where it is supplied to the control of the magnification element through the digital to analog converter illustrated.

Figure 5:
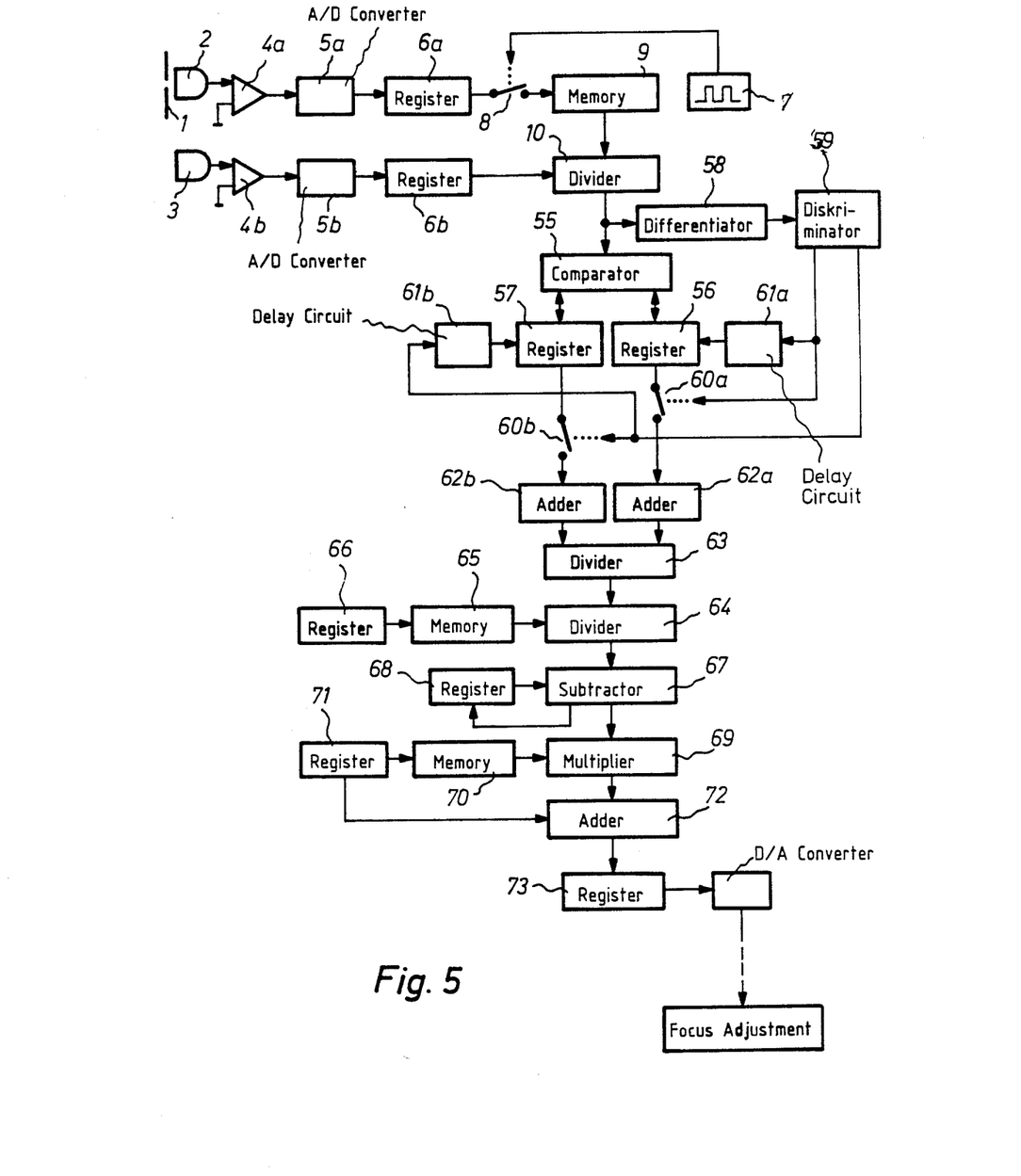
FIG. 5 illustrates apparatus for measuring and correcting the focal adjustment of the exposure spot.

The measurement and correcting of the focus of the exposure spot is also accomplished with the invention and reference may be made to FIG. 5 for one example of such control. Assume that the exposure spot is composed of superimposed gauss functions according to FIG. 1. The principle of focus measurement is the determination of the modulation of the measured amplitude values whereby a suitable plurality of sub-beams, for example, every second one is suppressed. This determination is made in the same manner up to the divider 10 of FIG. 5 in the same manner as is done in FIG. 2, for the control of the intensity and such elements will not be redescribed with regard to FIG. 5. The output of the divider 10 is supplied to a comparator 55 with the maximum and minimum values stored in registers 56 and 57 and these registers are reloaded with the upward or downward transgressions, respectively. At the same time, the measured amplitude values are supplied to a differentiator 58 from the divider 10 and the output of the differentiator 58 is supplied to a discriminator 59 which detects the reversal of operational sign. A switch 60a is actuated by the discriminator when the signal changes from positive to negative and the maximum value is loaded into an adder 62a from the register 56 when the switch 60a is closed. The output of the discriminator 59 is also supplied to a delay element 61a which supplies an output to the register 56 for setting the register 56 to the maximum value. The minimum value is also supplied to a register 57 from the discriminator 59 when a negative to positive change occurs. For this purpose, the discriminator 59 controls switch 60b which supplies the output of register 57 to the adder 62b and the discriminator 59 also supplies an input to the delay means 61b which supplies an input to the register 57 to establish the minimum value. Sums of the maximum values at the output of the adder 62a is divided in the divider 63 by the sum of the minimum values from the adder 62b and the output of divider 63 is divided in a divider 64 by a rated value that is stored in the memory 65 and which is selected by the current magnification value that is stored in register 66. The quotient is a measure for the focus which is subtracted in a subtractor 67 which receives the output of the divider 64 from the value of the direction which is either +1 or −1 stored in a register 68 and represents the amount required for the correction. The operational sign of the direction value is reversed. A correction value stored in memory 70 controls the multiplication factor of a multiplier 69 which receives an input from the register 71 which is the value of the control characteristic. An adder 72 receives the output of the multiplier 69 and also an input from the register 71 and supplies an output to the register 73 which adds the correction value to the current focus control value stored in the register 71 to form the new focus control value which is supplied to a register 73. The adjustment of the focus which might comprise an electro-mechanical lens focusing means is driven by the output of the register 73 through the digital to analog converter illustrated.

Figure 6:
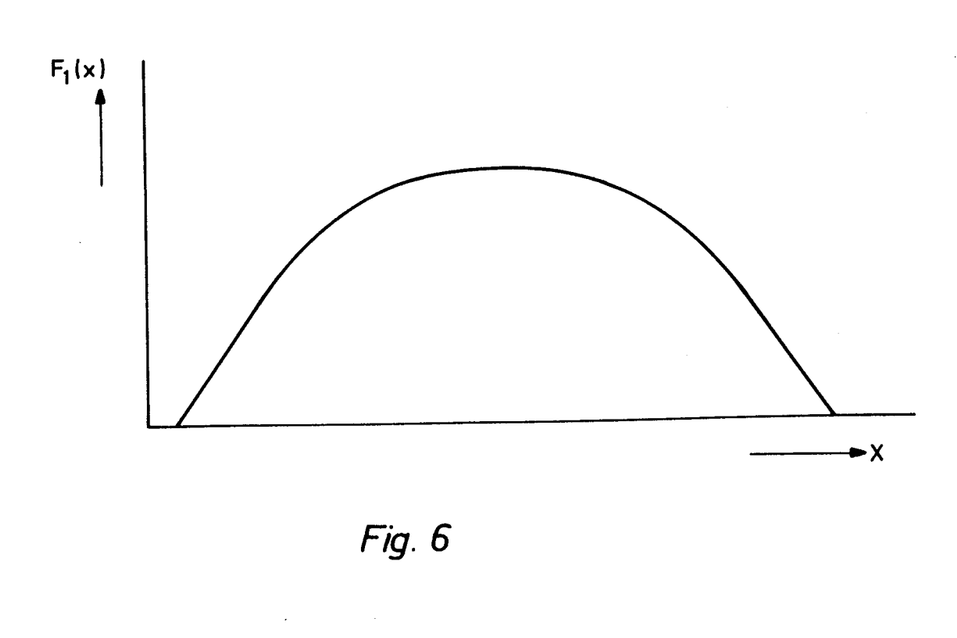
FIG. 6 comprises a curve illustrating the intensity distribution of the exposure spot without local minimums.
Figure 7:
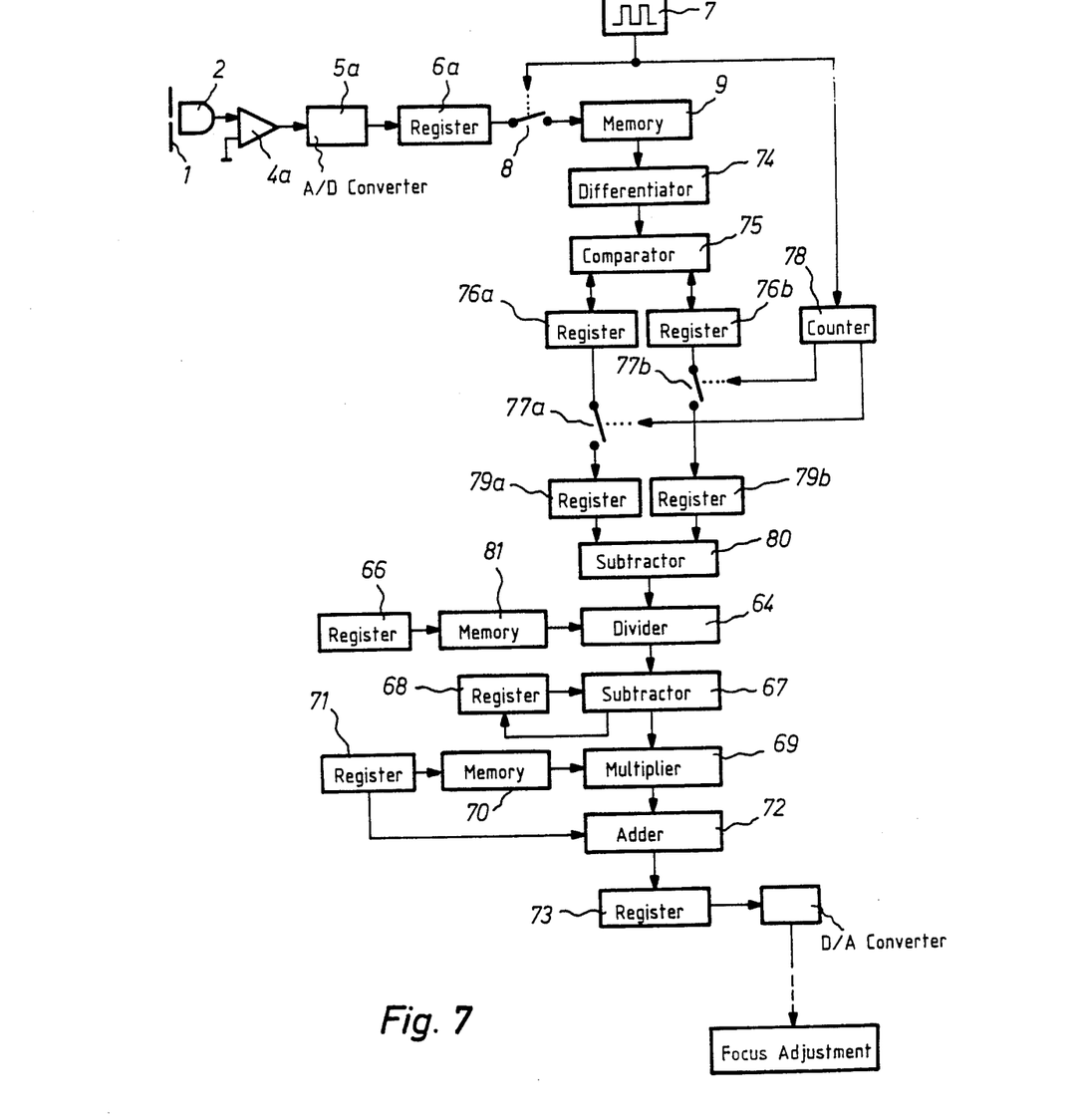
FIG. 7 illustrates a means for measuring and correcting the focus adjustment of the exposure spot.

A further inventive example for measuring and connecting the focus of an exposure spot is illustrated in FIG. 7 where the exposure spot contains no pronounced local minimums as, for example, illustrated in FIG. 6. The principle of this focus measurement consists in the determination of the edge steepness. The determination of the measured amplitude values occurs as in the case of size measurement. In FIG. 7, these values are differentiated in a differentiator 74 and the values of the differentiated quotients are supplied to a comparator 75 where they are compared to the minimum and maximum values stored in register 76a and 76b. The registers 76a and 76b are overwritten when downward and upward transgressions occur. After sampling of the exposure spot the switches 77a and 77b are actuated by the pulses from the counter 78 that is incremented by the clock generator 7 and the greatest slope values of the ascending and descending edges are loaded into registers 79a and 79b and are supplied to a subtractor 80 whereby they are combined. A divider 64 receives the output of subtractor 80 where they are divided by a function supplied by memory 81 which receives an input from a register 66. The processing from the divider 64 to the focusing control is the same as described with reference to FIG. 5 and will not be repeated for this embodiment.

The sequence of the deconvolution calculation indicated above is presented in greater detail below.

Let the function $F_0 = f(x,y)$ be given, whereby $F_0$ is constantly differentiatable, with $$F_o \geq 0 \quad \forall \ x \ \epsilon(x_0, x_1), y\epsilon(y_0, y_1)$$
$$= 0 \text{ outside}$$

Further, let $$F_1 = f(x){:}F_1(x) = \int_{y_0}^{y_1} F_0(x,y')dy' \quad (1)$$

$F_1$ is also constantly differentiatable and applying is $$F_1 \geq 0 \quad \forall \ x \ \epsilon(X_0, X_1)$$
$$= 0 \text{ outside}$$

The interrogation of a function $F_1(x)$ by a function $F_2(x')$ produces a convoluted value $\tilde{F}(x)$ with $$\tilde{F}(x) = F_1(x) * F_2(x) = \int_{-\infty}^{\infty} F_1(x - \tau) \cdot F_2(\tau)d\tau \quad (2)$$

The exposure density distribution of an exposure spot can be described by a function $F_0$. The value integrated in one direction (y) is then given by the function $F_1(x)$. A parallel gap of sufficient height integrates in y-direction. The scanning (sampling) of the function $F_0(x, y)$ in x-direction with a gap can therefore be described by the one dimensional function $\tilde{F}(x)$ [2]. Such a gap having the width S is described by the rectangle function.

$$F_2(x') = \begin{cases} 1 \ \forall \ x' \ \epsilon \left[ x - \frac{s}{2}, x + \frac{s}{2} \right) \\ 0 \ \forall \ x' {:} x - \frac{s}{2} > x' \geq x + \frac{s}{2} \end{cases} \quad (3)$$

Equation (3) inserted in equation (2) produces $$\tilde{F}(x) = \int_{x - \frac{s}{2}}^{x + \frac{s}{2}} F_1(x - \tau) d\tau \quad (4)$$

$$\frac{d\tilde{F}(x)}{dx} = F_1\left(x + \frac{s}{2}\right) - F_1\left(x - \frac{s}{2}\right) \quad (5)$$

$F_1(x)$ is to be determined:

$$F_1\left(x + \frac{s}{2}\right) = \frac{d\tilde{F}(x)}{dx} + F_1\left(x - \frac{s}{2}\right) \quad (6)$$

Existing due to the restriction of the exposure spot to the region $[X_0, x_1] \times [y_0, y_1]$ are x to which $$F_1\left(x - \frac{s}{2}\right) = 0, \frac{d\tilde{F}(x)}{dx} \neq 0$$

applies so that the function $F_1(x)$ for all $x\epsilon[x_0, x_1]$ can be determined by means of successive determination of (6) from the edge (=scanning), an x given by the clock is employed in the realization in the described form instead of dx and the difference quotient is formed instead of the differential quotient. Instead of equation (6), calculations are then carried out with the equation $$F_1\left(x + \frac{s}{2} - \frac{\Delta x}{2}\right) = \frac{\tilde{F}(x) - \tilde{F}(x - \Delta x)}{\Delta x} + F_1\left(x - \frac{s}{2} - \frac{\Delta x}{2}\right) \tag{6'}$$

Figure 8:
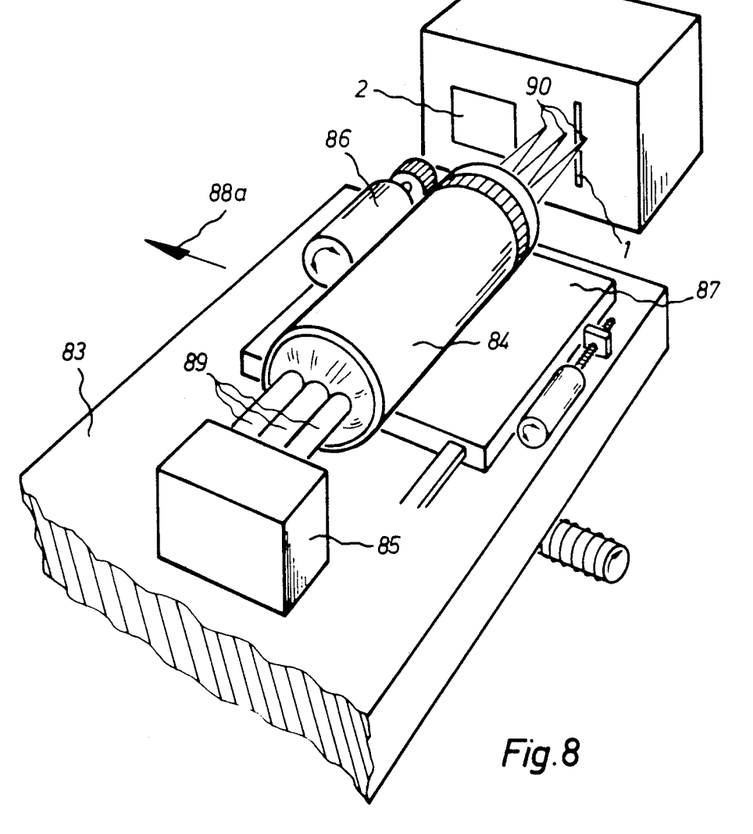
FIG. 8 illustrates apparatus for generating a relative motion between the exposure spot and the gap using an mechanical advance of the optical arrangement.

FIGS. 8 through 12 illustrate various embodiments of apparatus for practicing the invention. For example, FIG. 8 illustrates an apparatus for producing a relative motion between the exposure spot and the gap 1 by mechanically advancing the optical exposure arrangement 83 in the direction indicated by the arrow 88a. The entire optical exposure arrangement is displaced relative to the gap 1. The optical exposure arrangement contains a means 85 for setting the amplitudes of the sub-beams 89 which are three in the present example which are supplied to a zoom lens 84 which has a magnification setting means 86 for changing the magnification and a focusing setting means 87 for changing the focus. Thus, the magnification of the zoom lens 84 can be changed by the motor 86 which controls its magnification and the focus can be changed by the motor which moves the focusing means 87.

Figure 9:
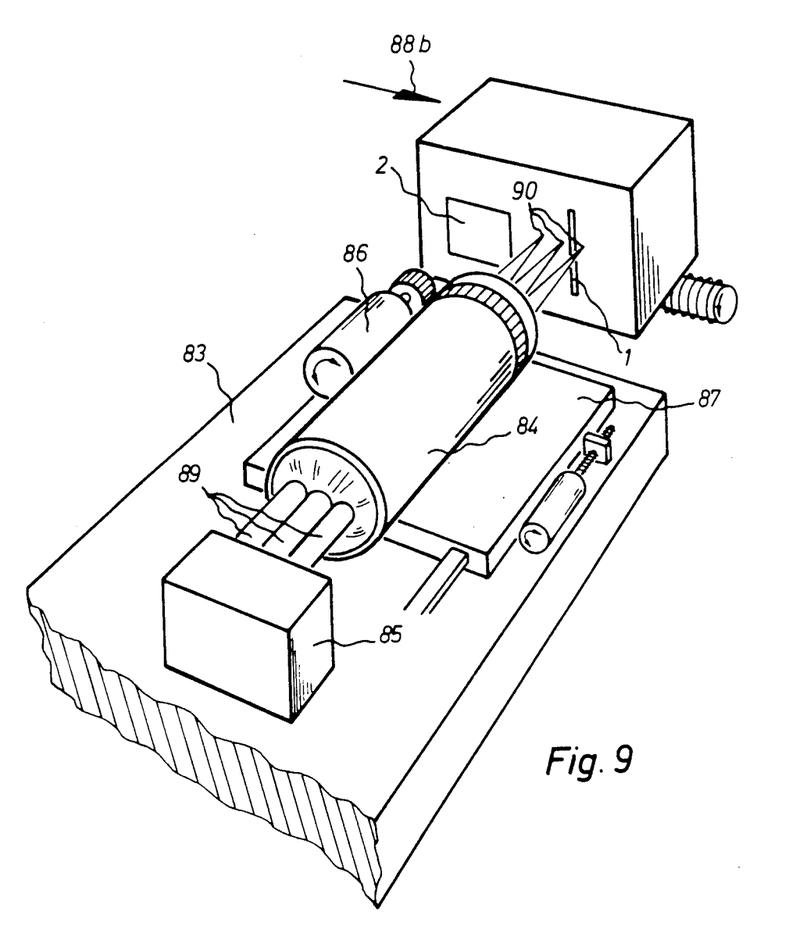
FIG. 9 illustrates apparatus for generating relative motion between the exposure spot and gap using a linear advance of the measuring installation with a gap.

FIG. 9 illustrates the same optical arrangement illustrated in FIG. 8 with a magnification control 86 and a focus control 87 whereby the relative motion indicated by the arrow 88b occurs by linearly advancing the gap 1 relative to the optical exposure arrangement 83 by the lead screw illustrated beneath the housing which contains the gap 1.

Figure 10:
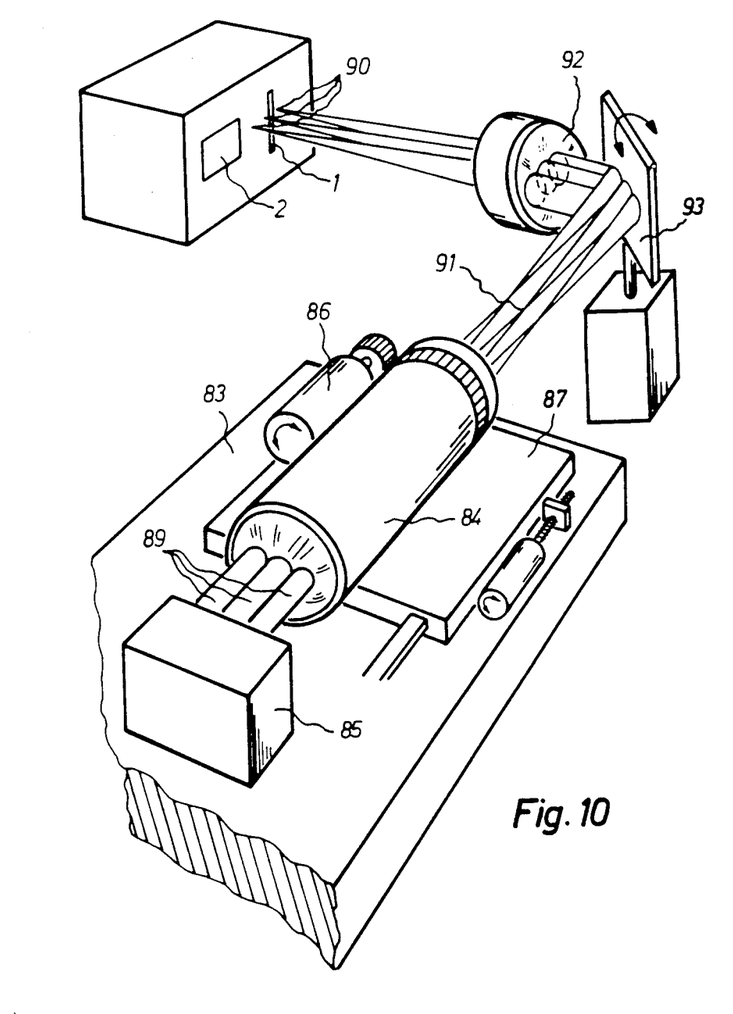
FIG. 10 illustrates apparatus for generating relative motion between the exposure spot and the gap using optical deflection and a galvanometer mirror.

FIG. 10 illustrates the same optical exposure arrangement 83 illustrated in FIG. 8 which has the magnification control 86 and the focus control 87 wherein the output of the zoom lens 84 comprising the exposure spots 91 impinge upon a galvanometer mirror 93 which deflects the beams 91 through optical lens 92 to the gap 1. The relative motion between the exposure spot and the gap 1 is produced by oscillating motion of the galvanometer mirror 93 which is controlled by a suitable motor means, for example.

Figure 11:
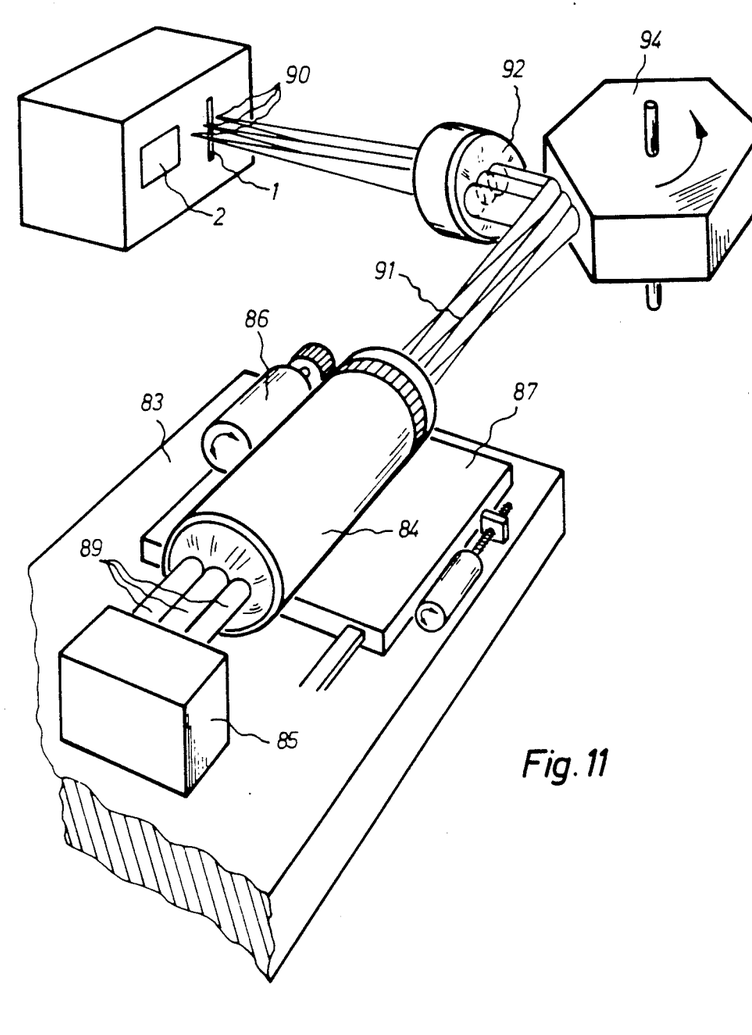
FIG. 11 illustrates apparatus for generating relative motion between the exposure spot and gap using an optical deflection and a rotating polyonal mirror.

FIG. 11 illustrates another embodiment which is similar to that illustrated in FIG. 10 accept the oscillating mirror 93 has been replaced by a rotating polygonal mirror 94 which deflects and moves the beams relative to the gap 1 as the mirror 94 rotates.

Figure 12:
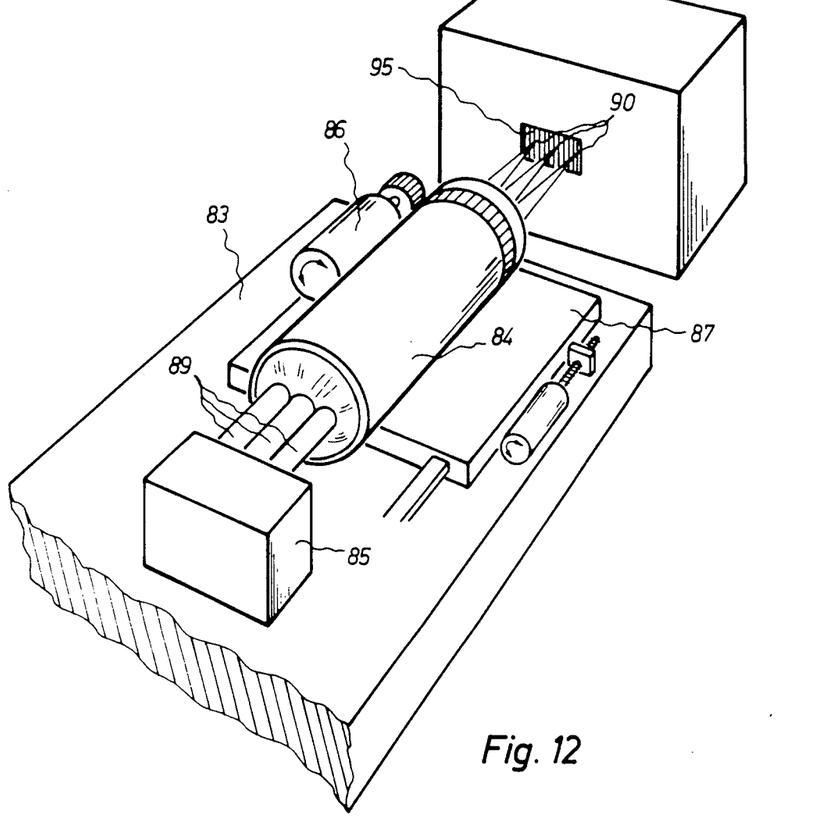
FIG. 12 illustrates a measuring installation utilizing a photo-diode array.

FIG. 12 illustrates another arrangement wherein the optical exposure arrangment 83 is the same as illustrated in 88. Instead of mechanical relative motion, the exposure spot is directed onto a stationary photo-diode array 95 that is mounted in the exposure plane. Instead of step by step interrogation of the exposure spot by the gap, the photo-diodes are interrogated in the same intercept distance. Corresponding photo-diodes are connected in parallel in the direction perpendicular thereto and the output of the photo-diodes are interrogated by electrically switching the outputs of the photo-diodes in sequence.

Although the invention has been described with respect to preferred embodiments, it is not to be so limited as changes and modifications can be made which are within the full intended scope of the invention as defined by the appended claims.

I claim as my invention:

1. A method for adjusting and monitoring an exposure spot for exposing light-sensitive material, whereby the exposure spot is composed of a plurality of controllable single beams which extend parallel to each other, comprising the steps of scanning the exposure spot through a gap of prescribed width, detecting with a phototransducer mounted in the exposure plane and is aligned at right angles to the direction of the sub-beams relative motion between the gap and the exposure spot and the light energy passing through the gap being measured, detecting with a further photo-transducer the entire exposure spot so as to obtain an integral measurement of the total light power of the spot, converting the electric signals acquired by means of the two photo-transducers into digital signals, and storing such digital signals, selecting from said stored digital signals, signals which belong to measuring Points having the same spacing in the exposure spot, standardizing for adjusting and monitoring the intensity distribution of the exposure spot the selected equidistant intensity signals of the first photo-transducer with the integral intensity signal of the second photo-transducer, determining the intensity distribution of the exposure spot integrated in the direction of the gap from the standardized signals by differentiating and adding values shifted by the column width, being determined according to the following equation $$F_1\left(x + \frac{s}{2} - \frac{\Delta x}{2}\right) = \frac{\tilde{F}(x) - \tilde{F}(x - \Delta x)}{\Delta x} + F_1\left(x - \frac{s}{2} - \frac{\Delta x}{2}\right)$$

whereby
$F_1(x)$ is the function of the intensity distribution in the exposure spot,
x is the coordinate of the position in the feed direction,
s is the gap width,
$\Delta x$ is the spacings of the equidistant signals, and
$\tilde{F}(x)$ denotes the measured intensity values, determining the topical maximums and minimums from the identified signals of the intensity distribution of the exposure spot and setting the intensity distribution of the appertaining sub-beams with the assistance of prescribed values of the topical maximums and minimums.

2. A method for adjusting and monitoring an exposure spot for the exposure of light-sensitive material, whereby the exposure spot is composed of a plurality of controllable single beams mounted next to each other, comprising the steps of scanning the exposure spot through a gap of prescribed width, detecting with a photo-transducer mounted behind said gap and which is situated in the exposure plane and aligned at right angles relative to the direction of the sub-beams, said scanning occuring by relative motion between the gap and the exposure spot, and measuring the light power passing through the gap, imaging the entire exposure spot onto a further photo-transducer and integrally measuring the total light power of the spot, acquiring the electric signals by the two photo-transducers and converting them into digital signals and intermediately storing said signals, successively acquiring the intermediately stored electric signals that belong to measuring points that are equidistant in the exposure spot, standardizing for the purpose of adjusting the size of the exposure spot, the intensity signals of the first photo-transducer with the integral intensity signal of the second photo-transducer, determining the intensity distribution of the exposure spot integrated in the direction of the gap from the standardized signals by differentiating and adding values displaced by the column width, being determined according to the following equation and stored $$F_1\left(x + \frac{s}{2} - \frac{\Delta x}{2}\right) = \frac{\tilde{F}(x) - \tilde{F}(x - \Delta x)}{\Delta x} + F_1\left(x - \frac{s}{2} - \frac{\Delta x}{2}\right)$$

whereby
$F_1(x)$ is the function of the intensity destribution in the exposure spot,
x is the coordinate the position in feed direction,
s is the gap width,
$\Delta x$ denotes the spacings of the equidistant signals, and
$\tilde{F}(x)$ denotes the measured intensity values, determining the topical maximums from the identified signals of the intensity distribution of the exposure spot and a threshold for the detection of the loci of the outer edges of the exposure spot is determined from the maximum values, reading out the stored signals of the intensity distribution and path values belonging to the corresponding intensity value are stored and compared to the threshold and a counter is incremented with the read-out, multiplying the counter by the spacing of the equidistant signals $\Delta x$, whereby an appertaining path value is obtained for each value read-out and is fixed at the outer limits of the exposure spot for upward or, respectively, downward transgression of the threshold, and determining the difference of the two path values and by using the difference value and a rated value, adjusting the size of the exposure spot with a means for changing the size of the exposure spot.

3. A method for adjusting and monitoring an exposure spot for exposing light-sensitive material, wherein the exposure spot is composed of a plurality of controllable single beams mounted next to each other, comprising the steps of scanning the exposure spot through a gap of prescribed width behind which a phototransducer is mounted and which is mounted in the exposure plane and aligned at right angles relative to the direction of the sub-beams, said scanning occurring by relative motion between the gap and the exposure spot, and measuring the light power passing through the gap, imaging the entire exposure spot onto a further photo-transducer and integrally measuring the total light power of the spot, converting the electric signals obtained by the two photo-transducers into digital signals and intermediately storing them, obtaining the intermediately stored electric signals that belong to measuring points which are equidistant in the exposure spot, standardizing for purposes of adjusting and monitoring the focusing of the exposure spot, the equidistant intensity signals of the first photo-transducer with the integral intensity signal of the second photo-transducer, determining under given conditions, the intensity distribution of the exposure spot integrated in the direction of the gap from the standardized signals by means of differentiating and adding values shifted by the gap width, being determined according to the following equation $$F_1\left(x + \frac{s}{2} - \frac{\Delta x}{2}\right) = \frac{\tilde{F}(x) - \tilde{F}(x - \Delta x)}{\Delta x} +$$

$$F_1\left(x - \frac{s}{2} - \frac{\Delta x}{2}\right)$$

whereby
$F_1(x)$ is the function of the intensity distribution in the exposure spot,
x is the coordinate of the position in feed direction,
s is the gap width,
$\Delta x$ denotes the spacings of the equidistant signals, and
$\tilde{F}(x)$ denotes the measured intensity values, in that the topical maximums and minimums are added up from the determined or, respectively, standardized intensity signals of the first photo-transducer, identifying the modulation degree from the resultant sums of the topical maximums and minimums and comparing them to a rated value for the modulation degree and generating a control value for a means for adjusting the focus.

4. A method for adjusting and monitoring an exposure spot for exposing light-sensitive material, whereby the exposure spot is composed of a plurality of controllable single beams mounted next to each other comprising the steps of scanning the exposure spot through a gap of prescribed width behind which a photo-transducer is mounted and which is mounted in the exposure plane and aligned at right angles relative to the direction of the sub-beams, scanning by relative motion between the gap and the exposure spot, and measuring the light power passing through the gap, imaging the entire exposure spot onto a further photo-transducer and integrally measuring the total light power of the spot, converting the electric signals acquired by means of the two photo-transducers into digital signals and intermediately storing said signals, calling up the intermediately stored electric signals that belong to measuring points which are equidistant in the exposure spot, forming for the purpose of adjusting and monitoring the focusing of the exposure spot the difference quotient of the called up signals, determining the slope values of the signals and the maximum or, respectively, minimum values and storing them, and generating a mean value from said stored values and a control signal for focus adjustment with a stored rated value for the edge steepness.

5. A method according to claims 1 or 2 or 3 or 4 wherein for producing relative motion the exposure spot is moved across the gap by moving the optical arrangement which generates the exposure spot.

6. A method according to claims 1 or 2 or 3 or 4 wherein for producing relative motion, the gap is moved across the exposure spot, for example by means of a rotating disc or linear movement.

7. A method according to claims 1 or 2 or 3 or 4 wherein for producing the relative motion, the exposure spot is moved across the photo-transducers by an optical deflection means, for example a galvanometer mirror or a polygonal mirror.

8. A method according to claims 1 or 2 or 3 or 4 wherein a row or an array of photo-transducers, for example a CCD line or a photo-diode array is employed and the exposure spot is imaged thereon and the signals are successively digitally stored.

9. Apparatus for controlling an exposure spot for exposing light sensitive material comprising, means for generating a plurality of scanning beams, means for controlling said scanning beams, a holder for said light sensitive material and formed with a slot through which plurality of scannning beams can enter, means for scanning said scanning beams on said slot, first light detecting means receiving the portion of the plurity of beams which enter said slot, a second light detecting means receiving said plurlity of beams, electrical processing means receiving the outputs of said first and second light detecting means and producing a control signal which is supplied to said means for controlling said scanning beams and wherein said control signal is indicative of intensity and said means for controlling is an intensity control.

10. Apparatus for controlling an exposure spot for exposing light sensitive material comprising, means for generating a plurality of scanning beams, means for controlling said scanning beams, a holder for said light sensitive material and formed with a slot through which said plurality of scanning beams can enter, means for scanning said scanning beams on said slot, first light detecting means receiving the portion of the plurality of beams which enter said slot, a second light detecting means receiving said plurality of beams, electrical processing means receiving the outputs of said first and second light detecting means and producing a control signal which is supplied to said means for controlling said scanning beams and wherein said control signal is indicative of focus and said means for controlling is a focus control.

11. Apparatus for controlling an exposure spot for exposing light sensitive material comprising, means for generating a plurality of scanning beams, means for controlling said scanning beams, a holder for said light sensitive material and formed with a slot through which said plurality of scanning beams can enter, means for scanning said scanning beams on said slot, first light detecting means receiving the portion of the plurality of beams which enter said slot, electrical processing means receiving the output of said first light detecting means and producing a control signal which is supplied to said means for controlling said scanning beams and wherein said control signal is indicative of focus and said means for controlling is a focus control.

12. Apparatus for controlling an exposure spot for exposing light sensitive material comprising, means for generating a plurality of scanning beams, means for controlling said scanning beams, a holder for said light sensitive material and formed with a slot through which said plurality of scanning beams can enter, means for scanning said scanning beams on said slot, first light detecting means receiving the portion of the plurality of beams which enter said slot, electrical processing means receiving the output of said first light detecting means and producing a control signal which is supplied to said means for controlling said scanning beams and wherein said control signal is indicative of magnification of said spot and said means for controlling is a magnification control.

13. Apparatus according to claim 10 including a discriminator for determining the direction of focus correction and supplying an output to said means for controlling the focus.

* * * * *